United States Patent [19]
Khan et al.

[11] Patent Number: 5,828,812
[45] Date of Patent: Oct. 27, 1998

[54] RECURRENT NEURAL NETWORK-BASED FUZZY LOGIC SYSTEM AND METHOD

[75] Inventors: Emdadur Rahman Khan, San Jose; William Shields Neely, Santa Clara, both of Calif.

[73] Assignee: National Semiconductor Corporation, Santa Clara, Calif.

[21] Appl. No.: 432,801

[22] Filed: May 2, 1995

Related U.S. Application Data

[63] Continuation-in-part of Ser. No. 265,194, Jun. 24, 1994, Pat. No. 5,606,646, which is a continuation-in-part of Ser. No. 36,634, Mar. 24, 1993, Pat. No. 5,579,439.

[51] Int. Cl.$^6$ .............................. G06E 1/00; G06E 3/00; G06F 15/18; G06G 7/00
[52] U.S. Cl. .................................. 395/22; 395/3; 395/61; 395/900; 395/21; 395/24
[58] Field of Search .................................. 395/3, 61, 900, 395/21, 24, 22, 23

[56] References Cited

U.S. PATENT DOCUMENTS

| | | | |
|---|---|---|---|
| 5,168,549 | 12/1992 | Takagi et al. ................................. | 395/3 |
| 5,416,888 | 5/1995 | Shimokawa ................................. | 395/22 |
| 5,479,571 | 12/1995 | Parlos et al. ................................. | 395/21 |

FOREIGN PATENT DOCUMENTS

| | | | |
|---|---|---|---|
| 2-260002 | 10/1990 | Japan ............................. | G05B 13/02 |
| 2-292602 | 12/1990 | Japan ............................. | G05B 13/02 |
| 3-268077 | 11/1991 | Japan ............................. | G06G 7/60 |
| 3-291729 | 12/1991 | Japan ............................. | G06F 9/44 |
| 4-77828 | 3/1992 | Japan ............................. | G06F 9/44 |
| 4-92901 | 3/1992 | Japan ............................. | G05B 13/02 |
| 4-170641 | 6/1992 | Japan ............................. | G06F 9/44 |
| 4-186402 | 7/1992 | Japan ............................. | G05B 13/02 |
| 4-205163 | 7/1992 | Japan ............................. | G06F 15/18 |

OTHER PUBLICATIONS

Keller, et al., "Fuzzy Logic Inference Neural Networks", SPIE, vol. 1192, pp. 582–591, Intelligent Robots and Computer Vision VIII: Algorithms and Techniques, 1989.

Cox, Earl, "Integrating Fuzzy Logic into Neural Nets", AI Expert, Jun. 1992, pp. 43–47.

Cela, et al., "Towards A Neural Fuzzy Controller", IEEE, Systems, Man, and Cybernetics, 1992 International, pp. 1277–1282.

Horikawa, et al., "On Fuzzy Modeling Using Fuzzy Neural Networks with the Back–Propagation Algorithm", IEEE, Transactions on Neural Networks, vol. 3, No. 5 Sep. 1992, pp. 801–806.

Sun, et al., "Fuzzy Modeling Based On Generalized Neural Networks And Fuzzy Clustering Objective Functions", IEEE, Proceedings of the 30th Conference on Decision and Control, Dec. 1991, Brighton, England, pp. 2924–2929.

Kawamura, et al., "A Prototype of Neuro–Fuzzy Cooperation System", IEEE International Conference On Fuzzy Systems, Mar. 8–12, 1992, San Diego, CA pp. 1275–1282.

Hamid R. Berenji, "Refinement of Approximate Reasoning–Based Controllers By Reinforcement Learning", Machine Learning: Proceedings of the Eighth International Workshop, Evanston, IL, Jun. 27–29, 1991 (5 pages).

Junhong Nie and D.A. Linkens, "Fuzzy Reasoning Implemented by Neural Networks", IEEE 1992, pp. II–702–II–707.

James J. Buckley, Yoichi Hayashi and Ernest Czogala, "On the Equivalence of Neural Networks and Fuzzy Expert Systems" IEEE 1992, pp. II–691–II–695.

(List continued on next page.)

*Primary Examiner*—Robert W. Downs
*Assistant Examiner*—Jason W. Rhodes
*Attorney, Agent, or Firm*—Limbach & Limbach L.L.P.

[57] ABSTRACT

A recurrent, neural network-based fuzzy logic system includes in a rule base layer and a membership function layer neurons which each have a recurrent architecture with an output-to-input feedback path including a time delay element and a neural weight. Further included is a recurrent, neural network-based fuzzy logic rule generator wherein a neural network receives and fuzzifies input data and provides data corresponding to fuzzy logic membership functions and recurrent fuzzy logic rules.

34 Claims, 9 Drawing Sheets

OTHER PUBLICATIONS

D.E. Rumelhart, G.E. Hinton and R.J. Williams, "Learning Internal Representation By Error Propagation", 1986, Chapter 41, pp. 675–682.

E. Khan et al., "NeuFuz: Neural Network Based Fuzzy Logic Design Algorithms", Fuzz–IEEE '93 Proceedings, vol. 1, pp. 647–654 (Mar. 28–Apr. 1, 1993).

E.H. Mamdani, "Twenty Years of Fuzzy Control: Experiences Gained and Lessons Learnt", Fuzz–IEEE '93 Proceedings, vol. 1, pp. 339–344 (Mar. 28–Apr. 1, 1993).

Z. Kohavi, "Switching and Finite Automata Theory", McGraw–Hill, New York, 1978, pp. 322 and 323.

"National Semiconductor Looks To Marry Neural Networks and Fuzzy Control", Electronic Products, Aug. 1992, p. 21.

"System Writes Fuzzy Logic Automatically", Electronics, Jul. 27 1992, p. 4.

Gorrini, V. and Bersini, H. "Recurrent Fuzzy Systems" Proceedings of the Third IEEE Conference on Fuzzy Systems. pp. 193–198, Jun. 26, 1994.

RECURRENT NEURAL NETWORK-BASED FUZZY LOGIC SYSTEM AND METHOD

RELATED APPLICATIONS

This is a Continuation-In-Part of U.S. patent application Ser. No. 08/265,194, filed Jun. 24, 1994, and entitled "Recurrent Neural Network-Based Fuzzy Logic System", now U.S. Pat. No. 5,606,646 (the disclosure of which is incorporated herein by reference), which in turn is a Continuation-In-Part of U.S. patent application Ser. No. 08/036,634, filed Mar. 24, 1993, and entitled "Fuzzy Logic Design Generator Using A Neural Network To Generate Fuzzy Logic Rules And Membership Functions For Use In Intelligent Systems", now U.S. Pat. No. 5,579,439 (the disclosure of which is incorporated herein by reference).

BACKGROUND OF THE INVENTION

1. Field of the Invention

The present invention relates to intelligent controllers, and in particular, intelligent controllers using neural network-based fuzzy logic.

2. Description of the Related Art

Uses of intelligent controllers have become more numerous and varied in keeping pace with the numerous and varied control requirements of complex modern electronic systems. For example, intelligent controllers are being called upon more frequently for use in assisting or use as servomechanism controllers, as discussed in commonly assigned U.S. patent applications Ser. No. 07/967,992, entitled "Intelligent Servomechanism Controller Using a Neural Network", and Ser. No. 07/859,328, entitled "Intelligent Controller With Neural Network and Reinforcement Learning" (the disclosures of which are each incorporated herein by reference). Further applications include control systems for robotic mechanisms.

One type of intelligent controller seeing increased use and wider application uses "approximate reasoning", and in particular, fuzzy logic. Fuzzy logic, initially developed in the 1960s (see L. A. Zadeh et al., "Fuzzy Sets and Applications", Selected Papers of L. A. Zadeh, by R. R. Yager, S. Ouchinnikov et al. (Eds.), John Wiley & Sons, 1987), has proven to be very successful in solving problems in many control applications where conventional model-based (mathematical modeling of the system to be controlled) approaches are very difficult, inefficient or costly to implement.

An intelligent controller based upon fuzzy logic design has several advantages including simplicity and ease of design. However, fuzzy logic design does have a number of disadvantages as well. As the control system complexity increases, it quickly becomes more difficult to determine the right set of rules and membership functions to accurately describe system behavior. Further, particularly in a feed-forward system, no recurrent information is embedded. In other words, conventional fuzzy logic rules retain no information about prior results or decisions. Hence, the ability to describe system behavior is limited.

The application of neural networks to learn system behavior has been suggested to overcome some of the problems associated with fuzzy logic-based designs. Using a system's input and output data, a neural network can learn the system behavior and, accordingly, generate fuzzy logic rules. See e.g.: E. Khan et al., "NeuFuz: Neural Network Based Fuzzy Logic Design Algorithms", FUZZ-IEEE'93 Proceedings, Vol. 1, pp. 647–54 (March 28–Apr. 1, 1993); E. Khan, "Neural Network Based Algorithms For Rule Evaluation and Defuzzification In Fuzzy Logic Design", WCNN'93 Proceedings, Vol. 2, pp. 31–38 (Jul. 11–15, 1993); E. Khan, "NeuFuz: An Intelligent Combination of Fuzzy Logic With Neural Nets", IJCNN'93 Proceedings, Vol. 3, pp. 2945–50 (Oct. 25–29, 1993); B. Kosko, "Neural Nets and Fuzzy Systems", Prentice Hall 1992; J. Nie et al., "Fuzzy Reasoning Implemented By Neural Networks", Proceedings of IJCNN92 (International Joint Conference on Neural Networks, June 1992), pp. II702-07; and J. Buckley et al., "On the Equivalent of Neural Networks and Fuzzy Logic", Proceedings of IJCNN92, pp. II691- 95.

However, a neural network may not always be the most effective way to implement an intelligent controller, since implementation of a neural network is more costly compared to fuzzy logic implementations. For example, fuzzy logic may be more effective for a particular application and, by proper programming, a conventional embedded controller can be used to implement the fuzzy logic. A neural network implementation by programming of the conventional embedded controller is also possible, but it will typically be significantly slower. Furthermore, a dedicated hardware implementation, generally more desirable, is more common for fuzzy logic than for a neural network, particularly when considering the relative costs of each.

Another problem with a neural network-based solution, particularly in a feed-forward system, is its dependence upon the present state of the input information or data. Difficulties arise when a solution requires memory in such applications as pattern recognition (including speech and handwriting), seismic signal processing, language processing, and spatiotemporal signal processing. For such applications, the outputs are not only the functions of the present inputs but also of the previous inputs and/or outputs as well.

Accordingly, it would be desirable to have an improved technique for applying neural network design to the design and implementation of fuzzy logic. In particular, it would be desirable to have a neural network-based, fuzzy logic design in which prior information could be retained for context-sensitive processing such as that needed for spatiotemporal signals. Further, it would be desirable to have an improved fuzzy logic design in which antecedent processing, rule evaluation (fuzzy inferencing) and defuzzification can be performed upon control signals generated in accordance with such neural network-based fuzzy logic design.

SUMMARY OF THE INVENTION

A recurrent neural network-based fuzzy logic system in accordance with the present invention provides for the retention and use of context-sensitive knowledge within a neural network-based, fuzzy logic system by using intra-system input and output recurrency. In a recurrent neural network-based fuzzy logic system in which input and output intra-neuron recurrency is used, knowledge of prior system inputs and outputs is used during both training and recall operations, thereby providing for even more accurate system operation due to the finer, more precise system learning which takes place.

In accordance with the present invention, a neuron receives and processes a plurality of input signals and in accordance therewith provides an output signal which is time-delayed by a time-delay element and in accordance therewith provided as one of the input signals.

A recurrent neural network apparatus in accordance with one embodiment of the present invention includes a plurality of neurons and a plurality of time-delay elements. The neurons are for receiving and processing a plurality of input signals and in accordance therewith providing an output signal, and each one of the time-delay elements is for receiving and time-delaying the output signal from a respective one of the neurons and in accordance therewith providing one of the input signals thereto.

A recurrent neural network-based fuzzy logic apparatus in accordance with another embodiment of the present invention includes first and second neural apparatuses and first and second time-delay apparatuses. The first neural apparatus is for receiving and processing first and second pluralities of input signals and in accordance therewith providing first and second pluralities of neural signals, wherein the first plurality of neural signals corresponds to a first plurality of fuzzy logic rule antecedents. The first time-delay apparatus is for receiving and time-delaying the second plurality of neural signals and in accordance therewith providing the second plurality of input signals. The second neural apparatus is for receiving and processing the first plurality of neural signals and a plurality of antecedent signals and in accordance therewith providing a plurality of consequent signals, wherein the plurality of antecedent signals corresponds to a second plurality of fuzzy logic rule antecedents and the plurality of consequent signals corresponds to a plurality of fuzzy logic rule consequents. The second time-delay apparatus is for receiving and time-delaying a portion of the plurality of consequent signals and in accordance therewith providing the plurality of antecedent signals.

A neural network apparatus for generating signals corresponding to a plurality of recurrent fuzzy logic rules, in accordance with still another embodiment of the present invention, includes first, second and third pluralities of neurons and a plurality of time-delay elements. The first plurality of neurons is for receiving and selectively fuzzifying a plurality of input signals and in accordance therewith providing a plurality of fuzzified signals. The second plurality of neurons, coupled to the first plurality of neurons, is for receiving the plurality of fuzzified signals and a first plurality of recurrent signals and in accordance therewith providing a plurality of membership signals corresponding to a plurality of fuzzy logic membership functions. The plurality of time-delay elements, coupled to the second plurality of neurons, is for receiving and time-delaying a portion of the plurality of membership signals and in accordance therewith providing the first plurality of recurrent signals. The third plurality of neurons, coupled to the second plurality of neurons, is for receiving the plurality of membership signals and a second plurality of recurrent signals and in accordance therewith providing a plurality of rule signals corresponding to a plurality of recurrent fuzzy logic rules.

A neural network apparatus for generating a plurality of recurrent fuzzy logic rules, in accordance with yet another embodiment of the present invention, includes first, second and third neural apparatuses and a time-delay apparatus. The first neural apparatus is for receiving and selectively fuzzifying a plurality of input data and in accordance therewith providing a plurality of fuzzified data. The second neural apparatus is for receiving the plurality of fuzzified data and a first plurality of recurrent data and in accordance therewith providing a plurality of membership data corresponding to a plurality of fuzzy logic membership functions. The time-delay apparatus is for receiving and time-delaying a portion of the plurality of membership data and in accordance therewith providing the first plurality of recurrent data. The third neural apparatus is for receiving the plurality of membership data and a second plurality of recurrent data and in accordance therewith providing a plurality of rule data corresponding to a plurality of recurrent fuzzy logic rules.

These and other features and advantages of the present invention will be understood upon consideration of the following detailed description of the invention and the accompanying drawings.

DETAILED DESCRIPTION OF THE INVENTION

Figure 1A:
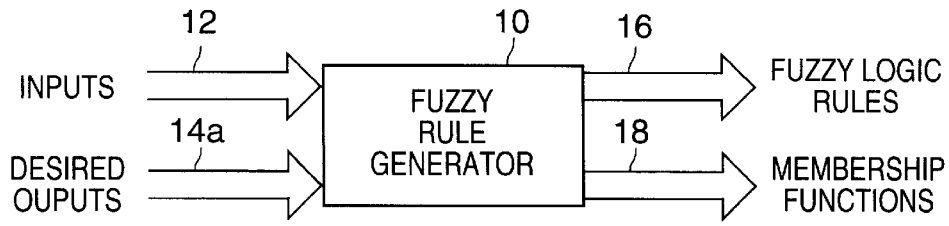
FIG. 1A depicts a fuzzy rule generator in accordance with the present invention.
Figure 1B:
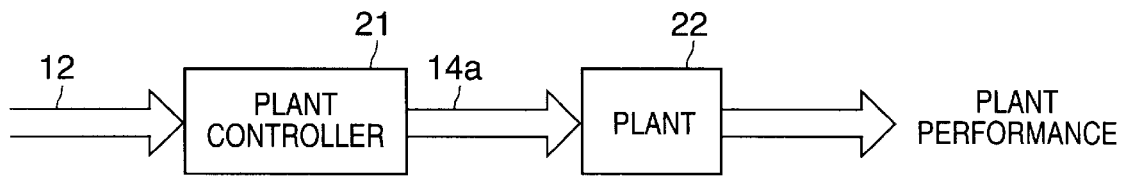
FIG. 1B illustrates a plant controller driving a plant, wherein the inputs and outputs of the plant controller are used for learning purposes by the fuzzy rule generator of FIG. 1A.

Referring to FIGS. 1A and 1B, a fuzzy rule generator 10 for generating fuzzy logic rules and membership functions with a neural network in accordance with the present invention receives input signals 12 and 14a representing the inputs and desired outputs, respectively, of a plant controller 21 used for controlling a plant 22. As is known in the art, the input 12 and desired output 14a data can be generated in a number of ways, such as simulation, measurement and learning of the inverse of the plant model. (See e.g. commonly assigned U.S. patent application Ser. No. 07/967,992, entitled "Intelligent Servomechanism Controller Using a Neural Network", the disclosure of which is incorporated herein by reference). Based upon this input data 12, 14a, the fuzzy rule generator 10, in accordance with neural network learning techniques, develops fuzzy logic rules and membership functions (discussed further below), and provides output signals 16 and 18 which represent those fuzzy logic rules and membership functions, respectively.

Figure 2A:
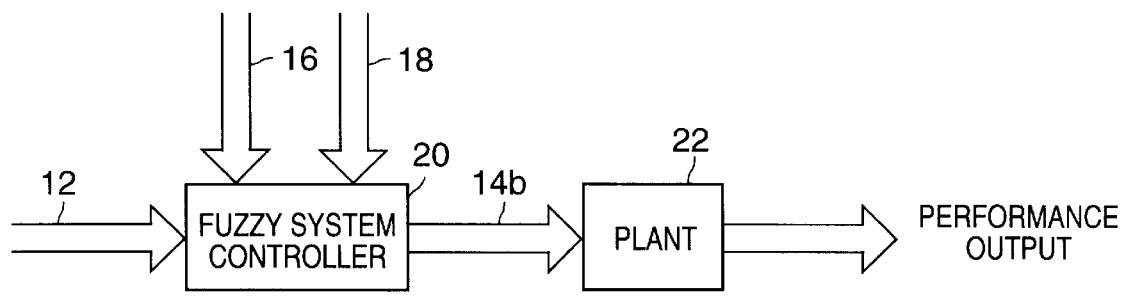
FIG. 2A illustrates a neural network driving a plant, in a feed-forward configuration, using the fuzzy logic rules and membership functions generated by the fuzzy rule generator of FIG. 1A.
Figure 2B:
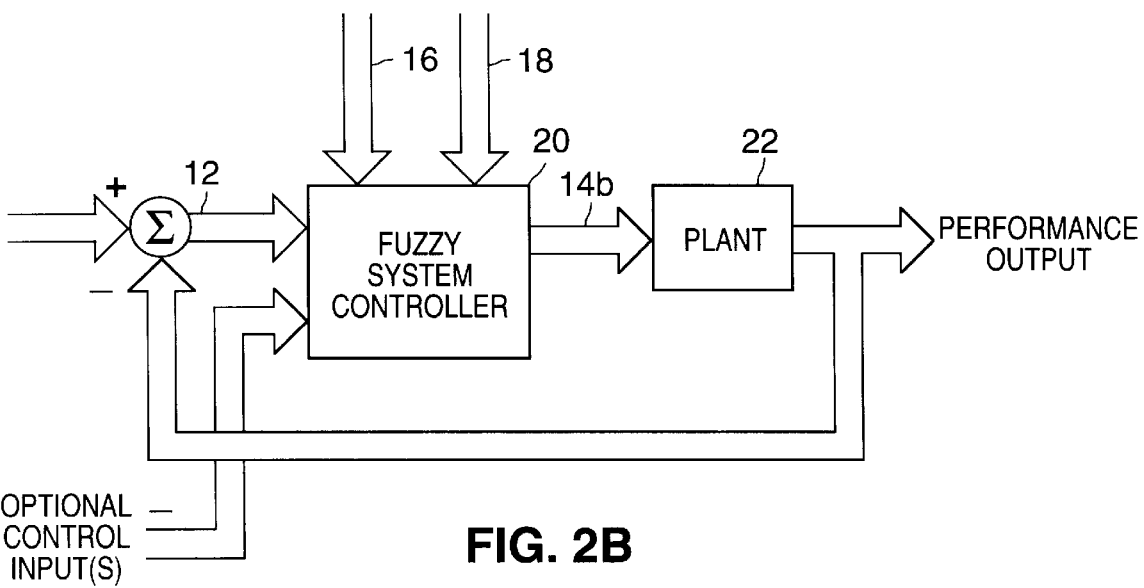
FIG. 2B illustrates a neural network driving a plant, in a feedback configuration, using the fuzzy logic rules and membership functions generated by the fuzzy rule generator of FIG. 1A.

Referring to FIGS. 2A and 2B, these fuzzy logic rules 16 and membership functions 18 are used by a fuzzy system controller 20 for generating plant control input(s) 14b in accordance with its inputs 12. (FIG. 2A illustrates a system with a feed-forward configuration, and FIG. 2B illustrates a system with a feedback configuration [with provision for other, optional inputs, such as an error change input].) Ideally, these controller outputs 14b generated by the fuzzy system controller 20 in accordance with the fuzzy logic rules 16 and membership functions 18 are identical to the desired outputs 14a originally used by the fuzzy rule generator 10 for its learning (i.e. for the same controller inputs 12). In practice, these controller outputs 14a and 14b are quite close, and often identical, when using fuzzy logic rules 16 and membership functions 18 generated with a fuzzy rule generator 10 in accordance with the present invention.

Figure 3:
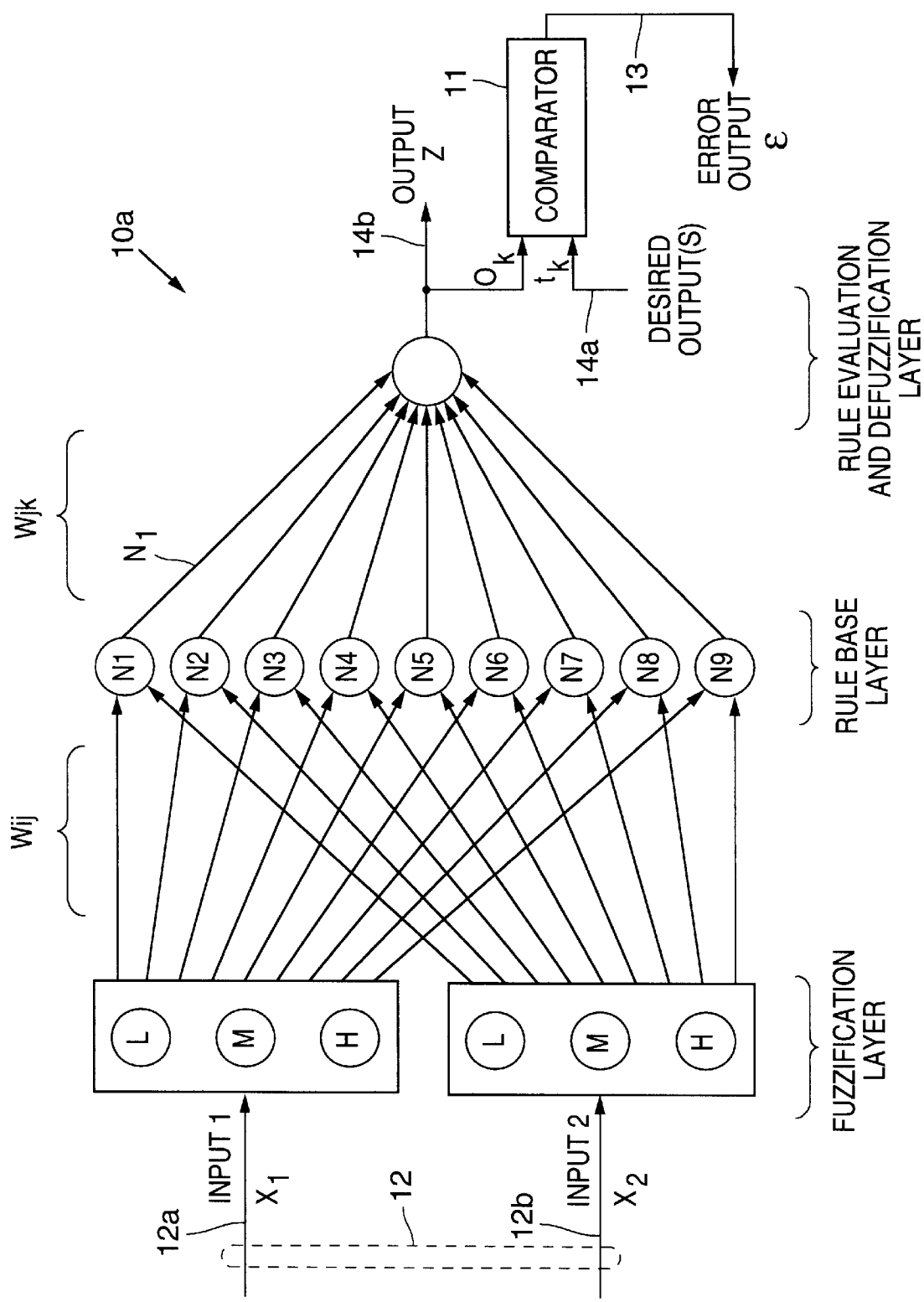
FIG. 3 illustrates a neural network for generating fuzzy logic rules and membership functions in accordance with the present invention.

Referring to FIG. 3, that portion 10a of the fuzzy rule generator 10 which forms the learning mechanism of the neural network includes a comparator 11 and three neural layers: (1) fuzzification; (2) rule base; and (3) rule evaluation and defuzzification. For the sake of simplicity in describing a preferred embodiment of the present invention, the learning mechanism 10a illustrated uses a three-layer neural network for generating the fuzzy logic rules and membership functions of a two-input, one-output system. (However, it should be understood that further embodiments of the present invention include such learning mechanisms using neural networks with more than three layers for generating the fuzzy logic rules and membership functions of systems with other than two inputs or one output.)

The first, or input, layer performs the fuzzification. The values of the input signals $X_1$, $X_2$ are matched against the labels used according to the fuzzy control rule. For this example, the fuzzy control rules represent relative input signal amplitudes classified as low ("L"), medium ("M") or high ("H"). The fuzzification layer is used to define the input membership functions. The middle, or rule base, layer (neurons N1 through N9) represents the fuzzy logic rule base. The actual output 14b of the output neuron is compared against the desired output(s) 14a, with the resulting error $\epsilon$ being used in the neural network's learning process.

In accordance with one embodiment of the present invention, the rule base neurons N1 through N9 have linear activation functions which perform multiplication, rather than summation, and have slopes of unity. Further, linear neurons whose functions also have slopes of unity are used for the output (rule evaluation and defuzzification) layer neuron. Therefore, the equivalent error $\epsilon_k$ at the input of the output layer can be computed as follows:

$$\epsilon_k = (t_k - o_k) f_k' \tag{1}$$

where:

$\epsilon_k$=equivalent error at the input of the output layer neuron $f_k'$=first derivative of the function of the output layer neuron $t_k$=desired output 14a of the output layer neuron $o_k$=actual output 14b of the output layer neuron Once this equivalent error $\epsilon_k$ has been computed, the middle-to-output layer eights $W_{jk}$ can be modified, or updated as follows:

$$W_{jk(new)} = W_{jk(old)} + \eta \epsilon_k o_j \tag{2}$$

where:

$W_{jk(new)}$=updated weight between middle (hidden) layer neuron j and output layer neuron k $W_{jk(old)}$=original weight between middle (hidden) layer neuron j and output layer neuron k $\eta$=learning rate $\epsilon_k$=equivalent error at the input of the output layer neuron $o_j$=actual output of the hidden layer neuron (Further discussion of interlayer weight modification can be found in the aforementioned commonly assigned U.S. patent application Ser. No. 07/859,328, entitled "Inteligent Controller With Neural Network and Reinforcement Learning", the disclosure of which is incorporated herein by reference.)

Next, the equivalent error $\epsilon_j$ at the input to the middle, or hidden, layer neurons N1 through N9 can be computed according to back-propagation modeling techniques as follows:

$$\epsilon_j = f_j' \sum_k \epsilon_k W_{jk} \tag{3}$$

where:

$\epsilon_j$=equivalent error at the input of middle (hidden) layer j $f_j'$=first derivative of the function of middle (hidden) layer neuron j (Further discussion of this back-propagation modeling technique can be found in the aforementioned commonly assigned U.S. patent application Ser. No. 07/967,992, entitled "Intelligent Servomechanism Controller Using a Neural Network", the disclosure of which is incorporated herein by reference.)

Following that, the equivalent error $\epsilon_i$ at the input to the input, or fuzzification, layer can be computed. However, as noted above, the middle, i.e. rule base, layer neurons N1 through N9 use multiplication instead of summation, as follows:

$$f_j = \prod_i W_{ij} o_i \tag{4}$$

where:

$f_i$=function describing the operation of the middle (hidden) layer neuron $W_{ij}$=weight between input layer neuron i and middle (hidden) layer neuron j $o_i$=output of input neuron i Accordingly, the equivalent error $\epsilon_i$ at the input to the fuzzification layer is computed as follows:

$$\epsilon_i = f_i' \sum_j \left[ \epsilon_j W_{ij} \left( \prod_{i, i \neq m} W_{mj} o_m \right) \right] \tag{5}$$

where:

$\epsilon_i$=equivalent error at the input of input layer i $f_i'$=first derivative of the function of input layer neuron i $\epsilon_j$=equivalent error at the input of middle (hidden) layer j $W_{ij}$=weight between input layer neuron i and middle (hidden) layer neuron j $W_{mj}$=weight between input layer neuron m and middle (hidden) layer neuron j $o_m$=output of input neuron m The input-to-middle layer weights $W_{ij}$ can then be modified, or updated, as needed using an equation similar to Equation (2) above, with appropriate substitutions for the corresponding equivalent error $\epsilon_n$ and output $o_n$ signals.

As seen in FIG. 3, the inputs to the middle layer neurons N1 through N9 are the preconditions, or antecedents, of the rules, and the outputs are the conclusions, or consequents. Accordingly, rule base layer neuron N1 can be interpreted as representing the rule that "if input $X_1$ is low and input $X_2$ is low, then the output is $N_1$", wherein $N_1$ can be used to represent the fuzzy conclusion from rule number one.

As noted above, and as is evident from Equation (4) above, the antecedent processing of the present invention uses a multiplication operation, rather than a "minimum" operation as is used in conventional fuzzy logic design. As discussed further below, this means that the signals representing the antecedents are multiplied within the rule base layer neurons N1 through N9, rather than summed and compared to a threshold, or minimum, reference value. For a two-input, one-output learning mechanism 10a, as shown in FIG. 3, if three membership functions are used, we need a maximum of $3^2=9$ rules. Therefore, we need nine middle, or rule base, layer neurons as shown. The output layer neuron, as discussed further below, performs the rule evaluation and defuzzification.

To help expedite learning and convergence, the neural network 10a of the fuzzy rule generator 10 is first initialized with some suitable values of interlayer weights $W_{ij}$, $W_{jk}$. Following that, a set of input 12 and desired output 14 data is applied for several cycles to allow the neural network 10a to converge. At that point, as discussed further below, the generated fuzzy logic rules and membership functions can be extracted. The inputs 12, 14 should be selected so as to cover the entire potential input range well. This will result in better learning, and therefore, a better set of fuzzy logic rules and membership functions. Also, the learning rates used for modifying the interlayer weights should be selected so that the neural network does not oscillate and so that it converges to a good local minima.

If it is desired to generate membership functions of different shapes, the fuzzification layer of FIG. 3 can be constructed of multiple layers of various types of neurons, including combinations of linear and nonlinear function neurons. Accordingly, the weight modification Equations (1) through (5) above will also be modified to correspond to these additional layers of neurons that generate the membership functions.

Figure 4:
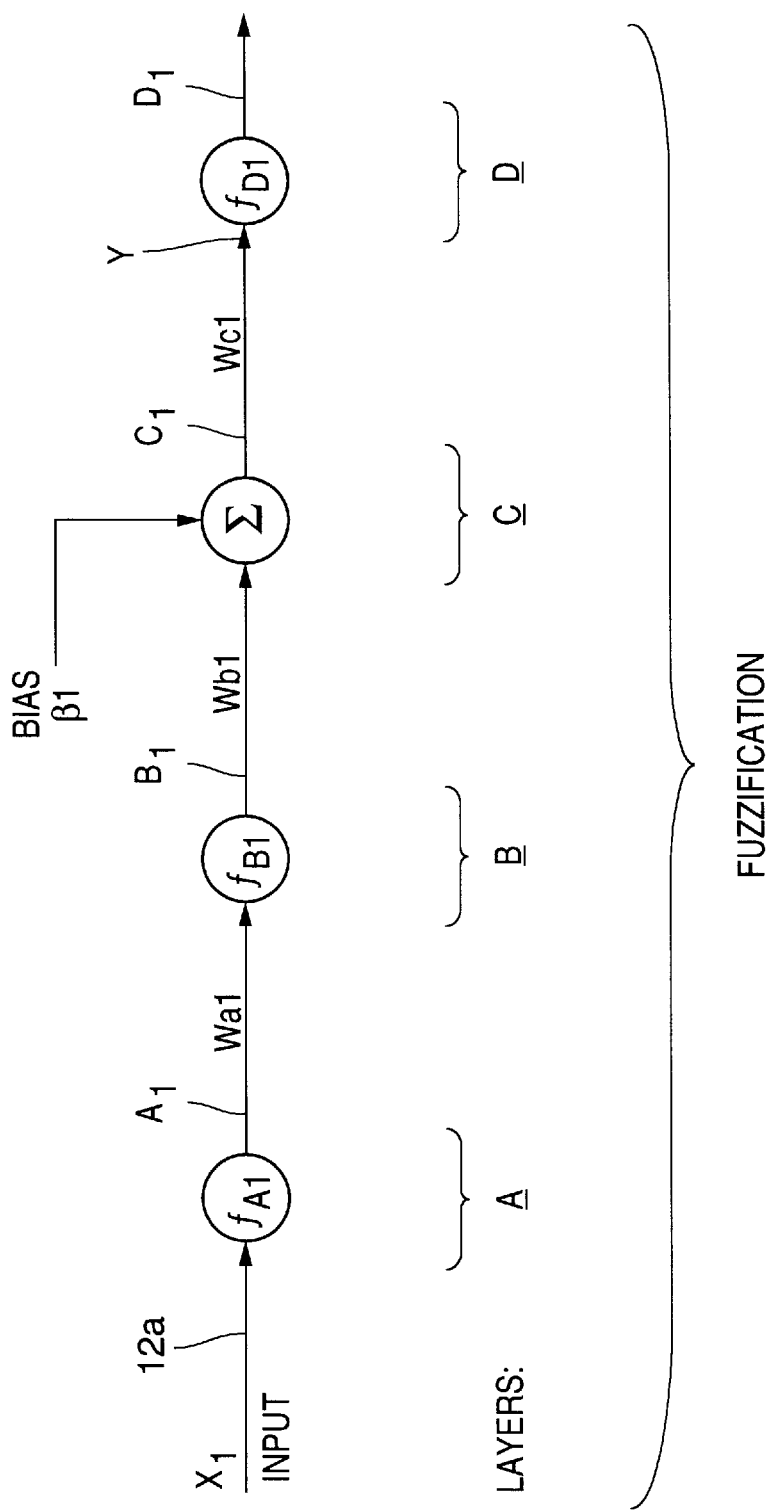
FIG. 4 illustrates an exemplary portion of the fuzzification layer of the neural network illustrated in FIG. 3.

Referring to FIG. 4, the fuzzification layer of the learning mechanism neural network 10a of FIG. 3 can be constructed of four layers A, B, C, D of neurons. For the sake of simplicity, only one signal path for input $X_1$ is shown. It should be understood that, depending upon how many membership functions are used for each input, additional signal paths will be required.

The input signal $X_1$ is processed by layer A and B neurons whose functions are $f_{A1}$ and $f_{B1}$, respectively. Their outputs $A_1$ and $B_1$ are weighted by the interlayer weights $W_{a1}$ and $W_{b1}$, respectively, with the result (i.e. the multiplication product $X_1 f_{A1} W_{a1} f_{B1} W_{b1}$) being summed in layer C with a bias signal $\beta_1$. The sum output $C_1$, weighted by interlayer weight $W_{c1}$, forms the input signal Y for the layer D neuron, whose nonlinear function $f_{D1}$ produces the output signal $D_1$ which goes to neuron N1 of the rule base layer (FIG. 3). Mathematically, this signal path can be represented as follows:

$$y = (X_1 f_{A1} W_{A1} f_{B1} W_{b1} + \beta_1) W_{c1} \tag{6}$$

where:

$X_1$=first input $f_{A1}$=first layer neuron function $W_{A1}$=weight between the first and second layer neurons $f_{B1}$=second layer neuron function $W_{b1}$=weight between the second and third layer neurons $\beta_1$=bias no. 1

$W_{c1}$=weight between the third and fourth layer neurons

The neural functions $f_{A1}$ and $f_{B1}$ of layers A and B can be kept constant, e.g. as linear gain functions, with the interlayer weights $W_{a1}$, $W_{b1}$ and $W_{c1}$ available for modification during the learning process. If the nonlinear function $f_{D1}$ of layer D is an exponential function (e.g. of the form $1/[1+e^{-y}]$), then the output $D_1$ can be expressed as follows:

$$\begin{aligned} D_1 &= f_D = 1/(1 + e^{-y}) \\ &= \frac{1}{1 + \exp[-y]} \\ &= \frac{1}{1 + \exp[-(X_1 f_{A1} W_{A1} f_{B1} W_{b1} + \beta_1) W_{c1}]} \end{aligned} \tag{7}$$

During learning, i.e. by modifying weights $W_{a1}$, $W_{b1}$, and $W_{c1}$, an exponential membership function can be established. As will be recognized from Equation (7) above, the size and shape of this membership function is determined by the weights $W_{a1}$, $W_{b1}$ and $W_{c1}$, and the bias $\beta_1$. Accordingly, by using different initial values of weights and biases among the various input signal paths, various exponential membership functions of the same type but with different shapes, sizes and positions, can be generated. For example, by using multiple neurons in layers C and D, and using different weight values for their input weights $W_{b1}$ and $W_{c1}$, any class of exponential type membership functions can be generated. Such membership functions would meet the criteria necessary to back-propagate error signals. However, it should be understood that other suitable mathematical functions could be used as well, such as $(1-e^{-y})/(1+e^{-y})$.

After these membership functions have been generated, the weights $W_{a1}$, $W_{b1}$, $W_{c1}$ remain fixed, and a neural network Recall operation will classify the input $X_1$ in one or more fuzzy logic classes (where each neuron in layer D defines a fuzzy logic class). (To perform the Recall operation, the input pattern $\overline{X}$, or vector, is applied to the input layer and propagated through the network without modifying any interlayer weights.)

The AND operation of the membership function noted above is performed as a multiplication operation. Therefore, the antecedent processing is performed according to:

$$v_c = v_a v_b \tag{8}$$

where:

$v_c$=membership function of the combination of membership functions $v_a$ and $v_b$ $v_a$=membership function of input A $v_b$=membership function of input B This use of multiplication, which is dictated by the use of a neural network, produces significantly improved results over those obtained using a "minimum" operation for processing the antecedents. Since the antecedent processing, and the rule evaluation and defuzzification are all based on neural network learning, as discussed further below, use of a "minimum" operation instead of a multiplication operation produces significant errors. Examples of the errors encountered can be seen by referring to Table 1 below.

TABLE 1

| INPUT 1 | INPUT 2 | MINIMUM | MULTIPLICATION |
|---------|---------|---------|----------------|
| 1.0 | 1.0 | 1.0 | 1.0 |
| 0.9 | 0.9 | 0.9 | 0.81 |
| 0.8 | 0.8 | 0.8 | 0.64 |
| 0.7 | 0.7 | 0.7 | 0.49 |
| 0.6 | 0.6 | 0.6 | 0.36 |
| 0.5 | 0.5 | 0.5 | 0.25 |
| 0.4 | 0.4 | 0.4 | 0.16 |
| 0.3 | 0.3 | 0.3 | 0.09 |
| 0.2 | 0.2 | 0.2 | 0.04 |
| 0.1 | 0.1 | 0.1 | 0.01 |

Figure 5:
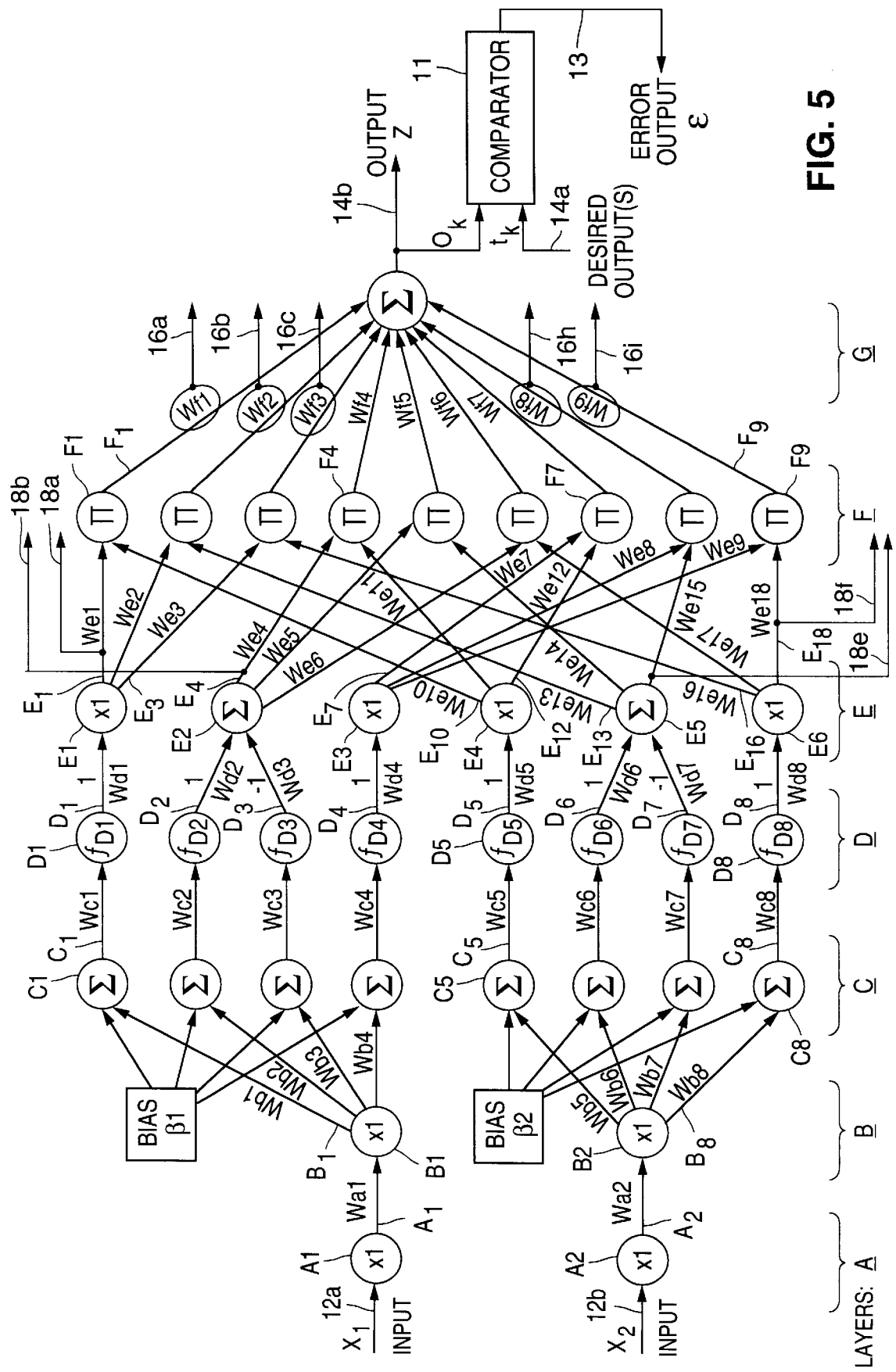
FIG. 5 illustrates in more detail the neural network of FIG. 3.

Referring to FIG. 5, one embodiment of a two-input, one-output neural network 10a in accordance with the present invention includes seven layers of neurons, i.e. layers A through G. The input signals $X_1$ and $X_2$ are received by the layer A neurons A1 and A2, which have gains of unity and produce intermediate signals $A_1$ and $A_2$, respectively. These signals $A_1$, $A_2$ are multiplied, i.e. weighted, by their respective interlayer weights $W_{a1}$ and $W_{a2}$ and received by the layer B neurons B1 and B2, which have gains of unity and produce intermediate signals $B_1$ through $B_4$ and $B_5$ through $B_8$, respectively (where $B_1=B_2=B_3=B_4$ and $B_5=B_6=B_7=B_8$).

These intermediate signals $B_1$ through $B_8$ are weighted by their respective interlayer weights $W_{b1}$ through $W_{b8}$ and received by the layer C neurons C1 through C8, which also receive the two bias signals $\beta_1$ and $\beta_2$. The layer C neurons C1 through C8 perform summation operations on these input signals ($C_1=B_1W_{b1}+\beta_1, C_2=B_1W_{b2}+\beta_1, \ldots, C_8=B_8W_{b8}+\beta_2$) and produce intermediate signals $C_1$ through $C_8$. These intermediate signals $C_1$ through $C_8$ are weighted by their respective interlayer weights $W_{c1}$ through $W_{c8}$ and received by the layer D neurons D1 through D8. These intermediate signals $C_1W_{c1}, C_2W_{c2}, \ldots, C_8W_{c8}$ are modified in accordance with the functions $f_{D1}$ through $f_{D8}$ of the layer D neurons D1 through D8 (per the discussion regarding Equation (7) above) to produce intermediate signals $D_1$ through $D_8$.

The intermediate signals $D_1$ through $D_8$ are weighted by their respective interlayer weights $W_{d1}$ through $W_{d8}$ which, with the exception of weights $W_{d3}$ and $W_{d7}$, have values of unity. Weights $W_{d3}$ and $W_{d7}$ have values of negative one (−1). The resulting product signals $D_1W_{d1}, D_2Wd_2, \ldots, D_8W_{d8}$ are received by the layer E neurons E1 through E6. Layer E neurons E1, E3, E4 and E6 have gains of unity and produce from their respective input signals $D_1W_{d1}, D_4W_{d4}, D_5Wd_5$ and $D_8W_{d8}$ further intermediate signals $E_1$ through $E_3$, $E_7$ through $E_{12}$ and $E_{16}$ through $E_{18}$ (where $E_1=E_2=E_3$, $E_7=E_8=E_9$, $E_{10}=E_{11}=E_{12}$ and $E_{16}=E_{17}=E_{18}$). Layer E neurons E2 and E5 receive their respective input signals $D_2W_{d2}$, $D_3W_{d3}$, $D_6W_{d6}$ and $D_7W_{d7}$, perform summation operations and provide intermediate signals $E_4$ through $E_6$ and $E_{13}$ through $E_{15}$ (where $E_4=E_5=E_6$ and $E_{13}=E_{14}=E_{15}$).

The neurons of layers A through E establish the membership functions 18. The membership functions 18 are established by taking the outputs of the layer E neurons 18a ($E_1$ [or $E_2$ or $E_3$]) through 18f ($E_{18}$ [or $E_{16}$ or $E_{17}$]) with respect to the network inputs 12a ($X_1$) and 12b ($X_2$). (For purposes of simplification, only membership function signals 18a, 18b, 18e and 18f have been labelled.) Thus, the membership functions 18 can be extracted for later use, e.g. by computing and storing the values of the outputs 18 versus inputs 12 functions (see e.g. FIG. 7).

The layer F neurons F1 through F9 serve as the rule base neurons and each perform multiplication, or product, operations on their respective input signals. For example, as shown, layer F neuron F1 receives and multiplies its input signals $E_1W_{e1}$ and $E_{10}W_{e10}$. Similarly, neuron F2 forms the product of its two input signals $E_2W_{w2}$ and $E_{13}W_{e13}$, and so on through neuron F9. Resulting product signals $F_1$ through $F_9$ are multiplied by their respective interlayer weights $W_{f1}$ through $W_{f9}$, with the resulting product signals $F_1W_{f1}, F_2W_{f2}, \ldots, F_9W_{f9}$ received by the layer G neuron. The layer G neuron performs a summation of all of these product signals to produce the final output signal Z.

The output layer weights 16a ($W_{f1}$) through 16i ($W_{f9}$) between the layer F and G neurons form the consequents of the fuzzy logic rules 16. The antecedents for the fuzzy logic rules 16 are formed by FUZZY($E_1$) through FUZZY($E_{18}$), where the function FUZZY($E_N$) represents the value of layer E output $E_N$ (where $N \in \{1,2,3,\ldots,18\}$) based upon the input XM (where $M \in \{1,2\}$) in accordance with the membership functions (discussed above). Accordingly, a typical rule for the configuration of FIG. 5 is: "If X1 is FUZZY(E1)" [e.g. "L" per FIG. 3], and X2 is FUZZY(E10) [e.g. "L" per FIG. 3], then the output is "$W_{f1}$." Thus, the fuzzy logic rules 16 can be extracted for later use by storing the values of the output layer weights 16a ($W_{f1}$) through 16i ($W_{f9}$).

Figure 6:
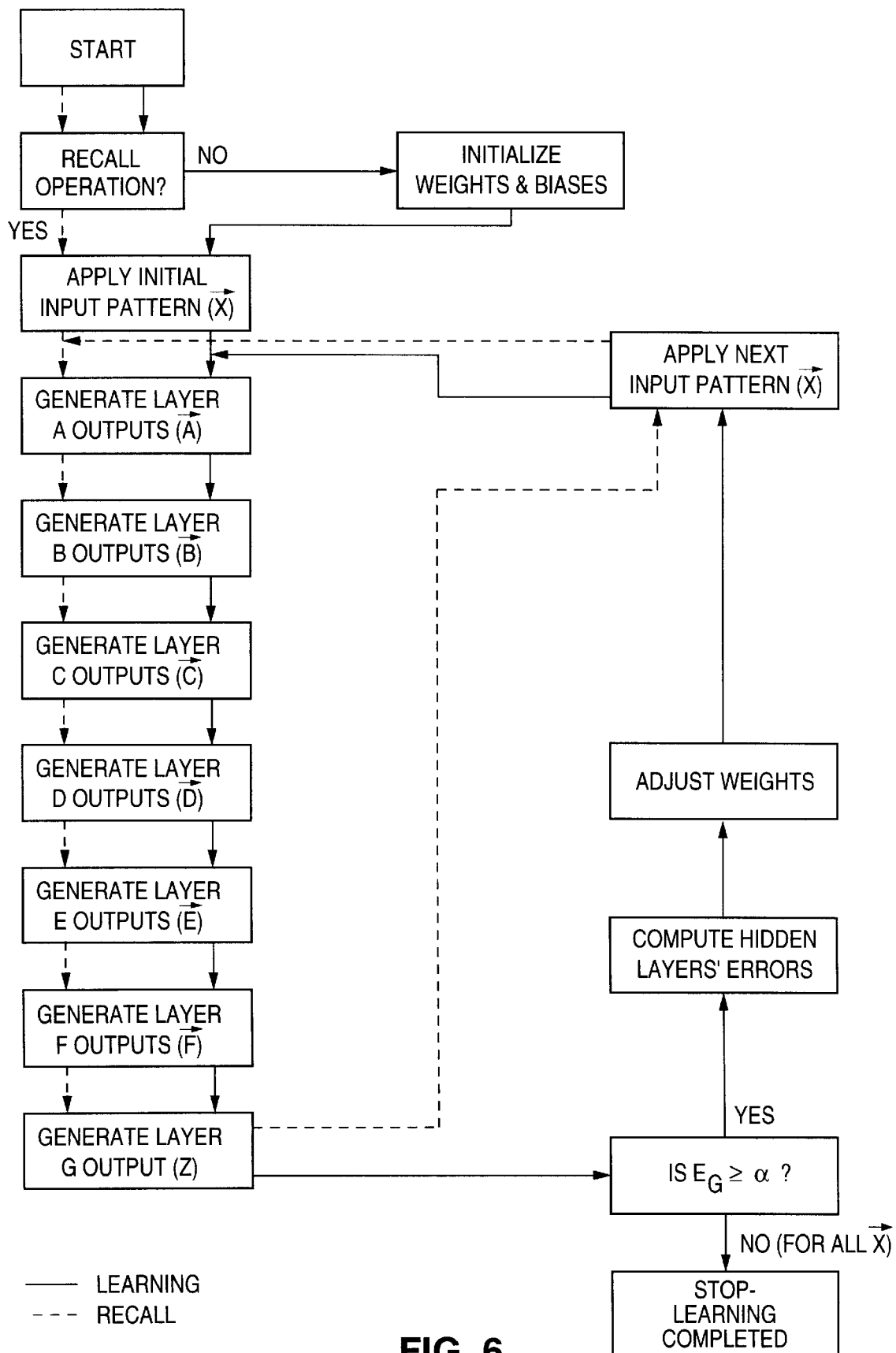
FIG. 6 illustrates a flowchart for neural network learning and Recall operations in accordance with the present invention.

Referring to FIG. 6, the operation of the neural network of FIG. 5 can be visualized in accordance with the illustrated flowchart. First, the interlayer weights $\overline{W}_a, \overline{W}_b, \overline{W}_c, \overline{W}_d, \overline{W}_e$ and $\overline{W}_f$, and biases $\beta_1$ and $\beta_2$ are initialized. Then, the layer A neurons A1, A2 receive the input signals $X_1$ and $X_2$, and generate the layer A outputs $\overline{A}$. The layer B neurons B1, B2 receive their respective input signals $\overline{AW}_a$ and generate the layer B neuron output signals $\overline{B}$. The layer C neurons C1 through C8 receive their respective input signals $\overline{BW}_b, \beta_1, \beta_2$, and generate the layer C outputs $\overline{C}$. The layer D neurons D1 through D8 receive their respective input signals $\overline{CW}_c$ and produce, in accordance with their respective nonlinear functions $f_{D1}$ through $f_{D8}$, the layer D outputs $\overline{DW}_d$. The layer E neurons E1 through E6 receive their respective inputs $\overline{DW}_d$ and generate the layer E outputs $\overline{E}$. The layer F neurons F1 through F9, the rule base neurons, receive their respective input signals $\overline{EW}_e$ and generate the layer F outputs $\overline{F}$. The layer G neuron receives signals $\overline{FW}_f$ and generates the layer G output Z.

In accordance with the discussion above regarding Equation (1), the output error $\epsilon_G$ is then computed and compared against a selected reference, or threshold, error value $\alpha$. If the output error $\epsilon_G$ is greater than or equal to the threshold $\alpha$, the equivalent errors $\epsilon_n$ for each of the hidden layers are computed in accordance with the discussion above regarding Equations (3) and (5). Following this, the interlayer weights $\overline{W}_a, \overline{W}_b, \overline{W}_c, \overline{W}_e$ and $\overline{W}_f$ are adjusted. (The interlayer weights $\overline{W}_d$ are not modified, but are kept at their original values of unity or negative one [−1].)

The foregoing steps are repeated until such time as the output error $\epsilon_G$ is less than the selected threshold error $\alpha$ for all input training patterns $\overline{X}$. Once $\epsilon_G < \alpha$ for all $\overline{X}$, the learning operation is complete.

Rule evaluation (fuzzy inferencing) and defuzzification are combined to form a single operation. As discussed further below, this single operation does not use any division, unlike conventional defuzzification such as COG. Accordingly, such defuzzification saves time and is more accurate since it is based on neural network learning, where accuracy can be controlled during learning by selecting the desired error criterion. This Defuzzification is performed as follows:

$$Z = \sum_j o_j W_{jk} \quad (9)$$

where:

Z=defuzzified output of neural network $o_j$=output of rule base layer neuron j $W_{jk}$=weight between rule base layer neuron j and output layer neuron k The defuzzified output Z includes the contribution from all of the rules within the rule base layer of neurons and matches the behavior of the neural network. Hence, this defuzzification (e.g. "neural defuzzification") is optimal, particularly since it does not require a division operation. This is to be contrasted with the conventional COG defuzzification operation, which is defined as follows:

$$Z = \left(\sum_i \upsilon_i V_i\right) / \left(\sum_i \upsilon_i\right) \quad (10)$$

where:

$\upsilon_i$=membership function i $V_i$=universe of discourse i i=index for universe of discourse (dependent upon number of output membership functions, shape of output membership functions and application)

In COG defuzzification, the index "i" for the universe of discourse can be more than the number of rules. On the other hand, in neural defuzzification according to the present invention, the summation index "j" is limited to the number of rules. Therefore, on the average, neural defuzzification has fewer multiplication operations, as well as no division operation.

As should be understood from the foregoing discussion, such neural defuzzification is actually a form of rule evaluation. Since the output of the rule is a "nonfuzzy" number, actual defuzzification is not required. Therefore, the terminology neural rule evaluation, rather than neural defuzzification, can also be used.

A qualitative example of the foregoing would be as follows. Referring back to FIG. 5, if one input 12a ($X_1$) was "low" (L) and the other input 12b ($X_2$) was "low" (L), then the output 14 (Z) would be represented by the product $F_1 W_{f1}$ (of the output $F_1$ and output weight $W_{f1}$ of the first layer F neuron F1).

Quantitatively, the neural network implementation and operation of FIGS. 4 and 5, respectively, have been simulated with very encouraging results. By way of example, one simulation involved the following highly nonlinear analog function:

$$Y = 2X_1^3 + 3X_2^2 \quad (11)$$

where $X_2 = 2X_1$ has been used to simplify the example.

The corresponding input signal data $X_1$, $X_2$, the resulting output Y, the learning rate η, learning factor and accuracy factor α used in this simulation are shown below in Table 2.

TABLE 2

Learning Rate (η) = 0.01
Learning Factor = 0.20
Accuracy Factor (α) = 0.008

| INPUT 1 X1 | INPUT 2 X2 | OUTPUT Y |
|---|---|---|
| -2.10 | -4.20 | 33.40 |
| -1.70 | -3.40 | 23.85 |
| -1.30 | -2.60 | 14.89 |

TABLE 2-continued

Learning Rate (η) = 0.01
Learning Factor = 0.20
Accuracy Factor (α) = 0.008

| INPUT 1 X1 | INPUT 2 X2 | OUTPUT Y |
|---|---|---|
| -0.90 | -1.80 | 7.26 |
| -0.50 | -1.00 | 1.75 |
| -0.10 | -0.20 | -0.88 |
| 0.30 | 0.60 | 0.13 |
| 0.70 | 1.40 | 5.57 |
| 1.10 | 2.20 | 16.18 |
| 1.50 | 3.00 | 32.75 |
| 1.90 | 3.80 | 56.04 |
| 2.10 | 4.20 | 70.44 |

In accordance with the foregoing discussion, the learning factor determines the learning rates within the inner layers of neurons, while the learning rate η corresponds to the output layer only. After the neural net has converged with the applied data to an accuracy factor α as indicated in Table 2 using seven input membership functions for each input, the fuzzy logic rules are generated (using the layer F neurons' outputs $F_1$ through $F_9$ and output weights $W_{f1}$ through $W_{f9}$). The resulting fuzzy logic rules for this example are shown below in Table 3.

TABLE 3

| X1 =\X2 = | LH | MH | SH | MD | SL | ML | LL |
|---|---|---|---|---|---|---|---|
| LH | 8.79 | 14.58 | 11.36 | 0.04 | 0.01 | 0.01 | 0.01 |
| MH | 14.58 | 3.62 | 9.86 | 0.20 | 0.01 | 0.01 | 0.01 |
| SH | 11.36 | 9.86 | 22.93 | 19.68 | 0.07 | 0.01 | 0.01 |
| MD | 0.04 | 0.20 | 19.68 | -1.63 | 4.46 | 0.66 | 0.07 |
| SL | 0.01 | 0.01 | 0.07 | 4.46 | 9.26 | 1.06 | 0.89 |
| ML | 0.01 | 0.01 | 0.01 | 0.66 | 1.06 | 5.89 | 11.53 |
| LL | 0.01 | 0.01 | 0.01 | 0.07 | 0.89 | 11.53 | 13.47 | where:
LH = large high
MH = medium high
SH = small high
MD = medium
SL = small low
ML = medium low
LL = large low
and where "large", "medium", "small", "high" and "low" are relative qualitative parameters (e.g. fuzzy variables).
EXAMPLE: If input X1 is SH and input X2 is MH, then output is 9.86.

Figure 7:
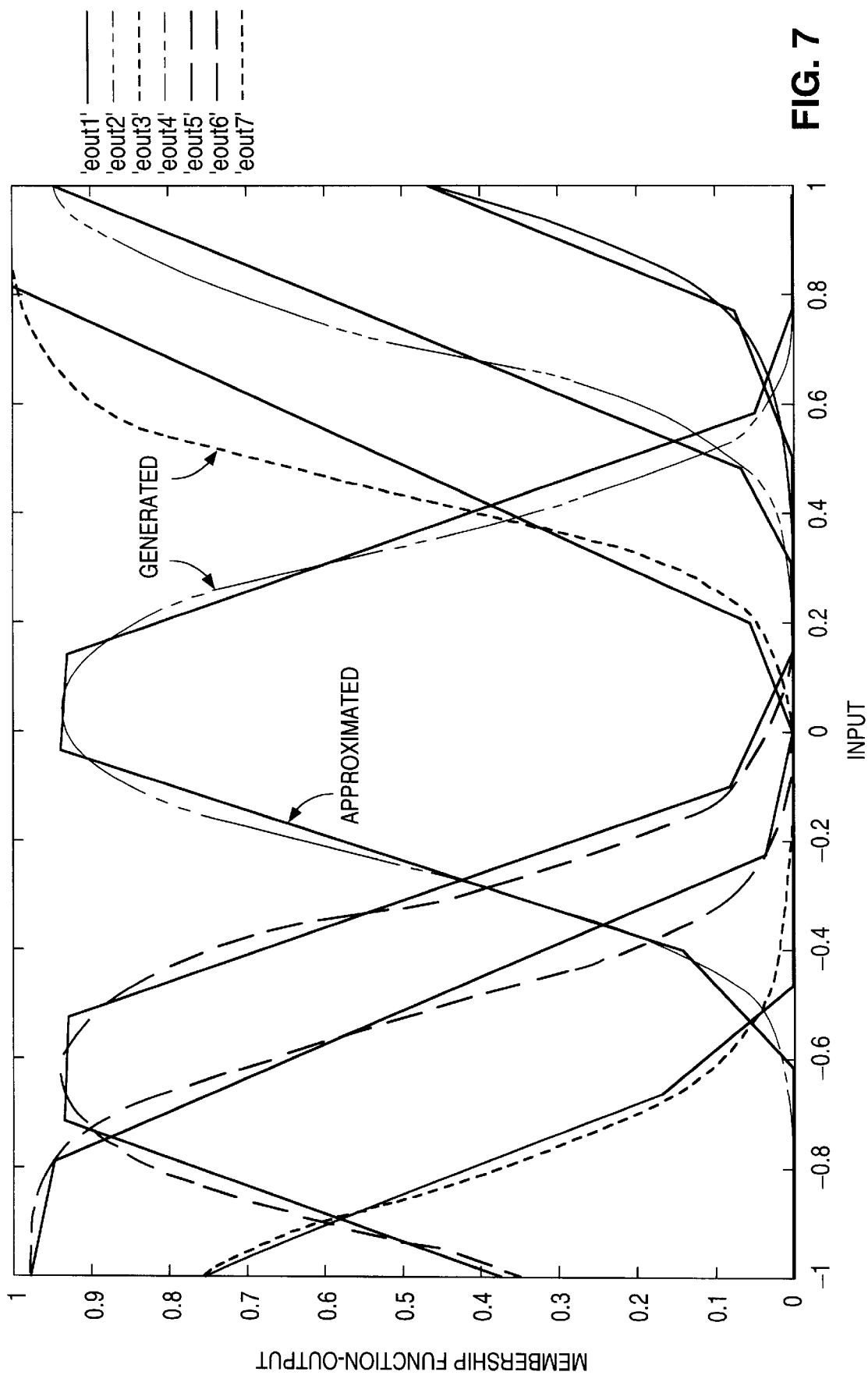
FIG. 7 illustrates an exemplary input membership function.

The data shown in Table 3 are numbers, i.e. singletons, as opposed to fuzzy numbers as used in conventional fuzzy logic. The shape of the input membership functions for input 1 ($X_1$) is shown in FIG. 7, and is generated by the neural network. The shape of the membership function for input 2 ($X_2$) is similar since input $X_1$ and X2 are related by Equation (11) above. Accordingly, the two-input, one-output system generated $7^2 = 49$ rules. The number of rules was reduced, i.e. optimized, to 25 using a "fuzzy rule verifier" which, as discussed further below, is basically a fuzzy logic system using the above-described neural network techniques. A set of Recall inputs was used along with the generated fuzzy logic rules and membership functions for both the non-optimized (49 rules) and optimized (25 rules) cases. The resulting computed outputs are shown below in Table 4.

TABLE 4

| Input 1 X1 | Input 2 X2 | Comp'd Out (49 Rules) | Comp'd Out (25 Rules) |
|---|---|---|---|
| −2.100 | −4.200 | 33.321 | 33.321 |
| −1.900 | −3.800 | 28.594 | 28.594 |
| −1.500 | −3.000 | 19.245 | 19.245 |
| −1.100 | −2.200 | 10.805 | 10.805 |
| −0.700 | −1.400 | 4.212 | 4.212 |
| −0.300 | −0.600 | 0.016 | 0.016 |
| 0.100 | 0.200 | −0.836 | −0.836 |
| 0.500 | 1.000 | 2.199 | 2.197 |
| 0.900 | 1.800 | 10.063 | 10.059 |
| 1.300 | 2.600 | 23.697 | 23.694 |
| 1.700 | 3.400 | 43.508 | 43.507 |
| 2.100 | 4.200 | 70.397 | 70.397 |

From the foregoing, a number of observations can be made. First, the result of the antecedent processing, rule evaluation and defuzzification using all of the possible fuzzy logic rules (i.e. all 49 rules) and membership functions generated in accordance with the present invention is substantially equal to the values generated in a neural network Recall operation (column 3). Further, it can be shown that using even fewer than 49 rules (e.g. 25 rules per column 4) will produce comparable results. This is advantageous in that it takes substantially less time, as well as less memory, to compute the output.

It can be seen by looking at the shape of the membership functions (e.g. FIG. 7) that implementing such membership functions on high end processors is not difficult. Moreover, for low end processors, such membership function shapes can be reasonably approximated to convenient geometric shapes, such as triangles or trapezoids. Such approximations can yield reasonably accurate defuzzified outputs.

Figure 8:
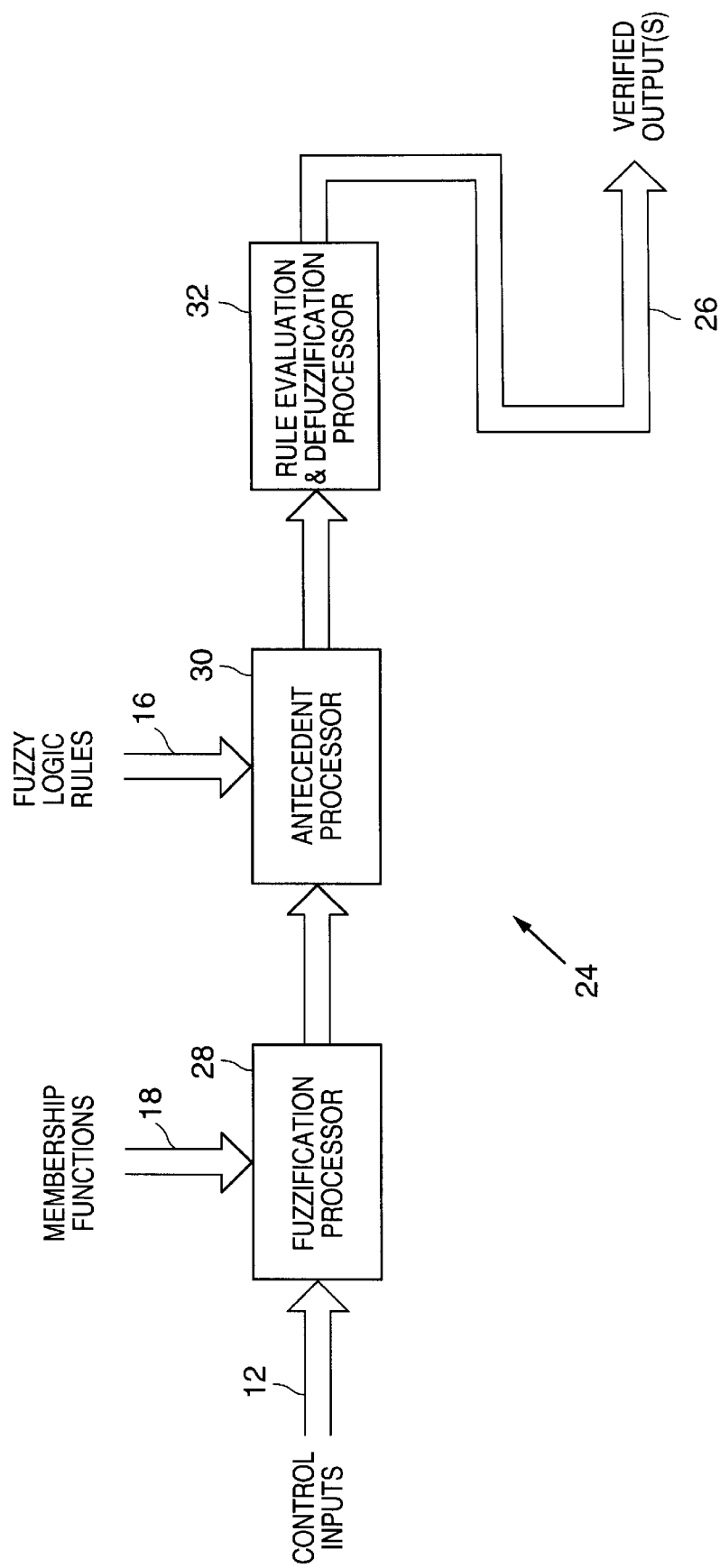
FIG. 8 depicts a fuzzy rule verifier and fuzzy system simulator suitable for use with the present invention.

Referring to FIG. 8, a fuzzy rule verifier 24 suitable for use with the present invention evaluates the fuzzy logic rules 16 and membership functions 18 generated by the fuzzy rule generator 10 of FIG. 1. The inputs to the fuzzy rule verifier 24 are the fuzzy logic rules 16, membership functions 18 and inputs 12 for which the verified output 26 needs to be computed. (The fuzzification processor 28, antecedent processor 30, and rule evaluation and defuzzification processor 32 can be constructed in the form of a multilayer neural network and operated in accordance with the discussion above regarding FIGS. 3, 4 and 5.)

To verify the fuzzy logic rules 16 and membership functions 18, the verified output 26 of the fuzzy rule verifier 24 is compared with the desired outputs 14. Some of the desired outputs 14', as discussed above, were used during the initial neural network training phase. The other desired outputs 14" can be obtained either by more measurements, or by performing a forward calculation on the learned neural network 10a (FIG. 3). (The latter can be done by performing a Recall operation within the fuzzy rule generator 10.)

From the foregoing, a number of observations can be made. The fuzzy rule verifier 24 can verify whether the computed output 26 from the defuzzification process for a set of inputs is the same as that obtained from a Recall operation through the fuzzy rule generator 10. This can check directly the accuracy of the generated fuzzy logic rules 16 and membership functions 18 provided by the fuzzy rule generator 10. Since the fuzzy rule generator 10 has the capability to reduce the number of fuzzy logic rules 16' methodically, a fuzzy rule verifier 24 can be used to verify whether the resulting defuzzified output 26 using fewer fuzzy logic rules 16' is sufficiently close to the value otherwise obtained from the Recall operation. Additionally, if approximated membership functions 18' are used, e.g. with more convenient geometric shapes, the fuzzy rule verifier 24 can be used to compute the resulting approximated defuzzified output 26' and compare it with the output 26 generated from the Recall operation. This way, acceptable results can be ensured while still allowing for the use of approximated membership functions 18'.

After the optimum number of fuzzy logic rules 16" and membership functions 18" has been determined (including the shapes of the membership functions) using the fuzzy rule verifier 24, a fuzzy logic system design can be completed. The completed design can then be implemented on a chosen processor. A conventional automated code converter can be used to take the fuzzy logic rules and the shape of the input membership functions and generate assembly code therefrom that can be executed by the chosen processor.

From the foregoing, it can be seen that the present invention advantageously combines beneficial attributes of neural networks and fuzzy logic, e.g. the adaptability, or learning capability, of the former and the simplicity of the latter. In doing so, the present invention provides an improved technique for applying neural networks to the design and implementation of fuzzy logic. However, further advantages can be realized by introducing "recurrency". Recurrency preserves temporal information and yields improved performance for context-dependent applications, while also reducing convergence time (which can be particularly beneficial in pattern recognition applications).

Figure 9:
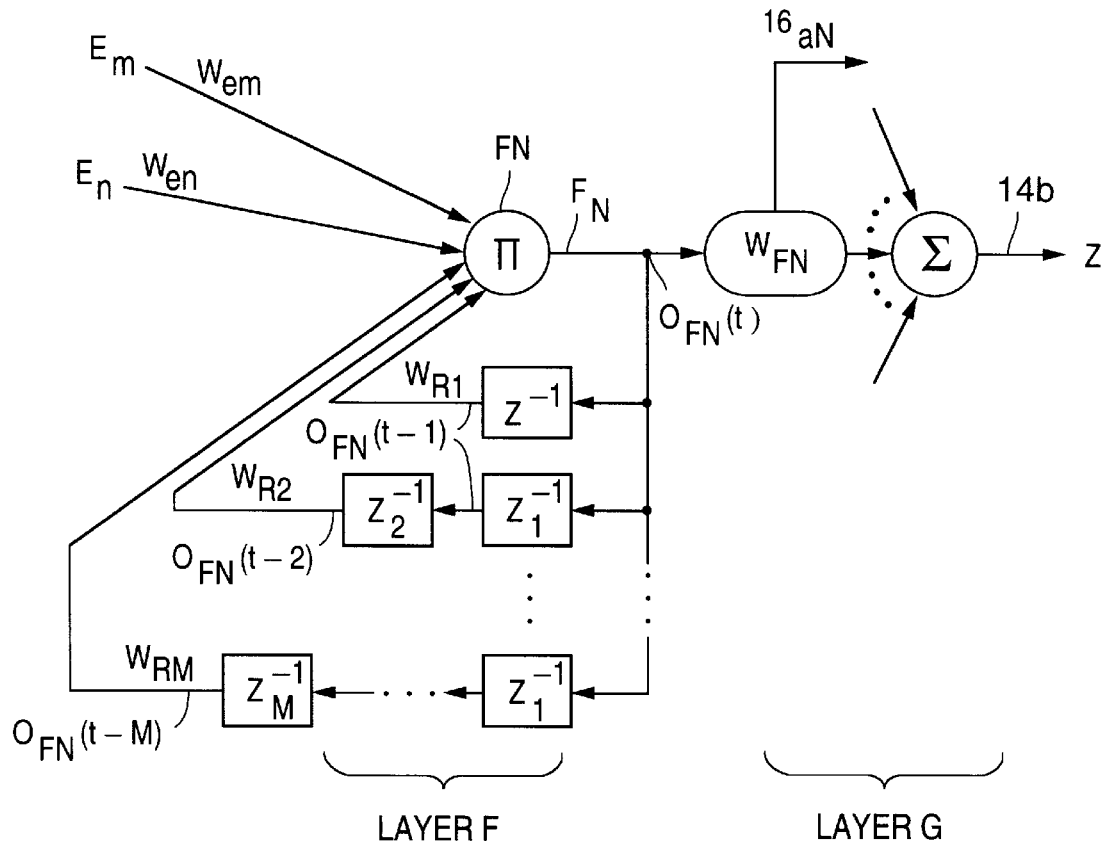
FIG. 9 illustrates a neuron for use in the neural network of FIG. 5 for implementing output recurrency in a recurrent neural network-based fuzzy logic system in accordance with the present invention.

Referring to FIG. 9, recurrency can be introduced by modifying the F-layer neurons FN in the neural network of FIG. 5 to add feedback paths, each of which includes at least one unit time delay element $Z^{-1}$ and an interneural weight $W_{Rm}$. For example, by feeding back the output $O_{FN}(t)$ through a feedback path with a unit time delay element $Z^{-1}$ and an interneural weight $W_{R1}$ the result $O_{FN}(t-1)$ would correspond to the prior state of the output $F_N$. Similarly, by feeding back the output $F_N$ through another feedback path with two unit time delay elements ($Z^{-1}{}_1$, $Z^{-1}{}_2$) and another interneural weight $W_{R2}$ the result $O_{FN}(t-2)$ would correspond to the two-unit delayed state of the output $F_N$ (and so on up through a feedback path with M unit time delay elements ($Z^{-1}{}_1$, $Z^{-1}{}_2$, ..., $Z^{-1}{}_M$) and an interneural weight $W_{RM}$ where the result $O_{FN}(t-M)$ would correspond to the Mth prior state of the output $F_N$).

The time-delayed feedback signals $O_{FN}(t-1)W_{R1}$, $O_{FN}(t-2)W_{R2}$, $O_{FN}(t-3)W_{R3}$, ..., $O_{FN}(t-M)W_{RM}$ serve as further antecedent signals, i.e. in addition to the original antecedent signals $E_m W_{em}$ and $E_n W_{en}$, for the neuron FN. (These "new" antecedent signals $O_{FN}(t-1)W_{R1}$, $O_{FN}(t-2)W_{R2}$, $O_{FN}(t-3)W_{R3}$, ..., $O_{FN}(t-M)W_{RM}$, as time-delayed versions of the output $O_{FN}(t)$, represent the context of the signal.) The output signal $O_{FN}(t)$ serves as the consequent signal for the neuron FN.

The training and recall operations of the overall neural network would be accomplished consistent with the foregoing discussion. For example, in accordance with the discussion above regarding Equation (2), the recurrent connection weights $W_{Ri}$ are modified, or updated, as follows:

$$W_{Ri(new)} = W_{Ri(old)} + \eta \epsilon_{FN}(t) O_{FN}'(t) \tag{12}$$

$$\epsilon_{FN}(t) = f_j' \sum_k \epsilon_{G,k} W_{FN,k} \tag{13}$$

where:
$W_{Rj}$=recurrent connection weight
i=1, 2, 3, ..., M
η=learning rate $\epsilon_{FN}(t)$=equivalent error at neuron FN $\epsilon_{FN}(0)$=zero $O_{FN}'(t)$=first derivative of function of output of neuron FN k=1, 2, 3, . . . , N $f_j'$=first derivative of function of middle (hidden) layer neuron j $\epsilon_{G,k}$=equivalent error at output of kth neuron in layer G $W_{FN,k}$=connection weight between F-layer neuron FN and kth neuron in layer G Consistent with Equation (4) above, the output $O_{FN}(t)$ of each neuron FN is:

$$O_{FN}(t) = E_m W_{em} \cdot E_n W_{en} \cdot \prod_{i=1}^{M} (1 + O_{FN}(t-i)W_{Ri}) \qquad (14)$$

Based upon the forgoing discussion, it should be appreciated that, due to the introduction of recurrency, the format of the fuzz logic rule (for product-based neurons—summation based neurons are discussed further below) becomes as follows:

If input X1=SH, input X2=MH, output $O(t-M)=W_{RM}$, . . . , and output $O(t-1)=W_{R1}$, then output $O(t)=W_{fN}$.

Figure 10:
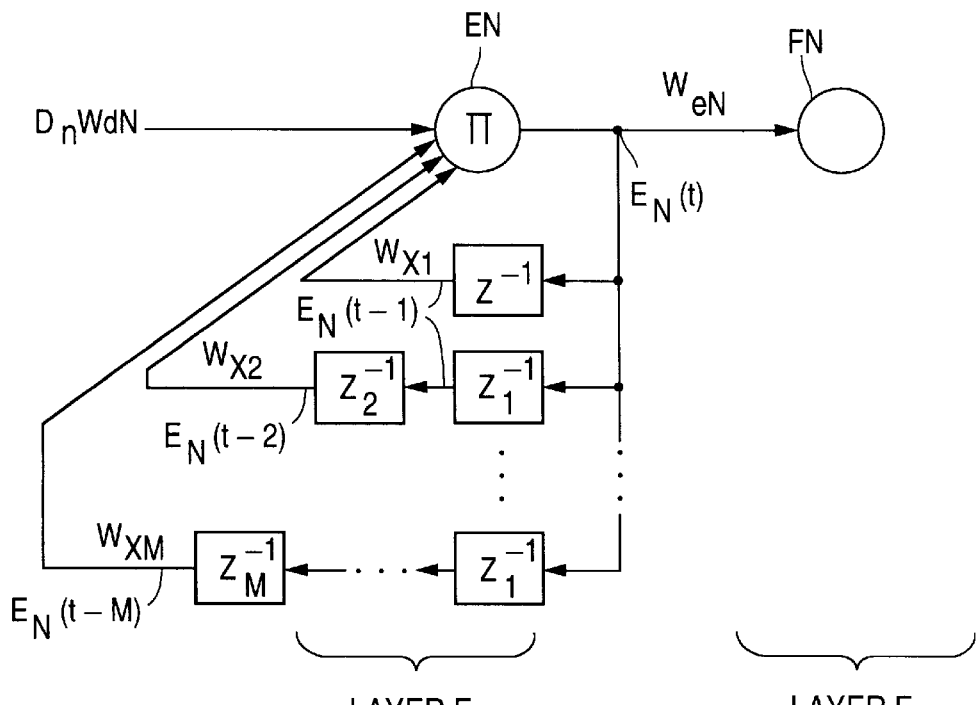
FIG. 10 illustrates a neuron for use in the neural network of FIG. 5 for implementing output recurrency in a recurrent neural network-based fuzzy logic system in accordance with the present invention.

Referring to FIG. 10, additional recurrency can be introduced by modifying the E-layer neurons EN in the neural network of FIG. 5 to add feedback paths, each of which includes at least one unit time delay element $Z^{-1}$ and an interneural weight $W_{Xm}$. For example, by feeding back the neuron output $E_N(t)$ through a feedback path with a unit time delay element $Z^{-1}$ and an interneural weight $W_{X1}$ the result $E_N(t-1)$ would correspond to the prior state of the output $E_N$. Similarly, by feeding back the output EN through another feedback path with two unit time delay elements $(Z^{-1}{}_1, Z^{-1}{}_2)$ and another interneural weight $W_{X2}$ the result $E_N(t-2)$ would correspond to the two-unit delayed state of the output $E_N$ (and so on up through a feedback path with M unit time delay elements $(Z^{-1}{}_1, Z^{-1}{}_2, \ldots, Z^{-1}{}_M)$ and an interneural weight $W_{XM}$ where the result $E_N(t-M)$ would correspond to the Mth prior state of the output $E_N$).

The time-delayed feedback signals $E_N(t-1)W_{X1}$, $E_N(t-2)W_{X2}$, $E_N(t-3)W_{X3}$, . . . , $E_N(t-M)W_{XM}$ serve as further input signals, i.e. in addition to the original input signal $D_n WdN$, for the neuron EN. (These "new" input signals $E_N(t-1)W_{X1}$, $E_N(t-2)W_{X2}$, $E_N(t-3)W_{X3}$, . . . , $E_N(t-M)W_{XM}$, as time-delayed versions of the neuron output $E_N(t)$, represent the context of the input signal.) The output signal $E_N(t)$ serves as the input signal for the following neuron FN.

The training and recall operations of the overall neural network would be accomplished consistent with the foregoing discussion. For example, in accordance with the discussion above regarding Equation (2), the recurrent connection weights $W_{Xi}$ are modified, or updated, as follows:

$$W_{Xk(new)} = W_{Xk(old)} + \eta \epsilon_{Ei}(t) E_i'(t) \qquad (15)$$

$$\epsilon_{Ei}(t) = f_e' \sum_j \left[ \epsilon_j W_{ij} \left( \prod_{i, i \neq m} W_{mj} o_m \right)_k O_{FN}(t-k) W_{Xk} \right] \qquad (16)$$

where:

$W_{Xk}$=recurrent connection weight k=1, 2, 3, . . . , M

η=learning rate $\epsilon_{Ei}(t)$=equivalent error at neuron Ei $\epsilon_{Ei}(0)$=zero $E_i'(t)$=first derivative of function of output of neuron Ei $f_e'$=first derivative of function of layer E neuron $W_{ij}$=connection weight between layer E and F neurons Consistent with Equations (4) and (14) above, the output $E_N(t)$ of each neuron EN is:

$$E_N(t) = D_n WdN \prod_{k=1}^{M} E_N(t-k) W_{Xk} \qquad (17)$$

Figure 11A:
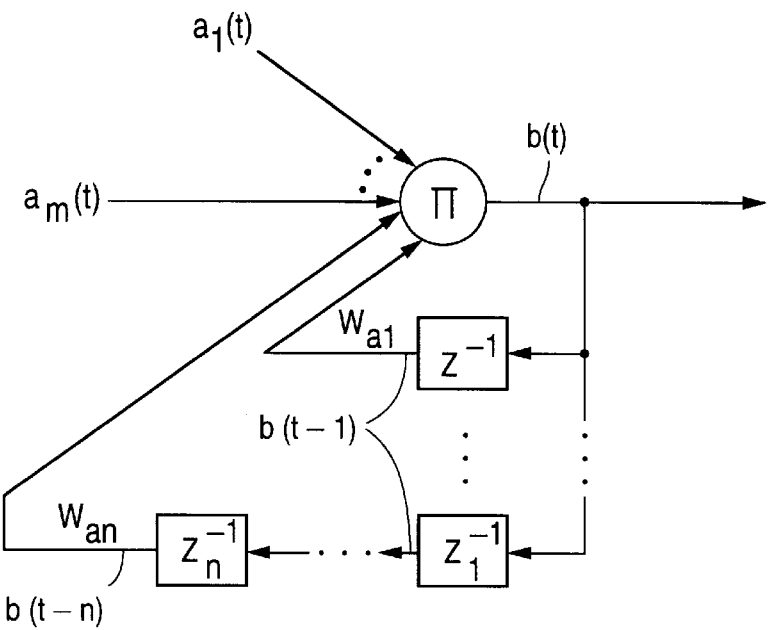
FIG. 11A illustrates the use of a product-based neuron for the artificial neurons of FIGS. 9 and 10.
Figure 11B:
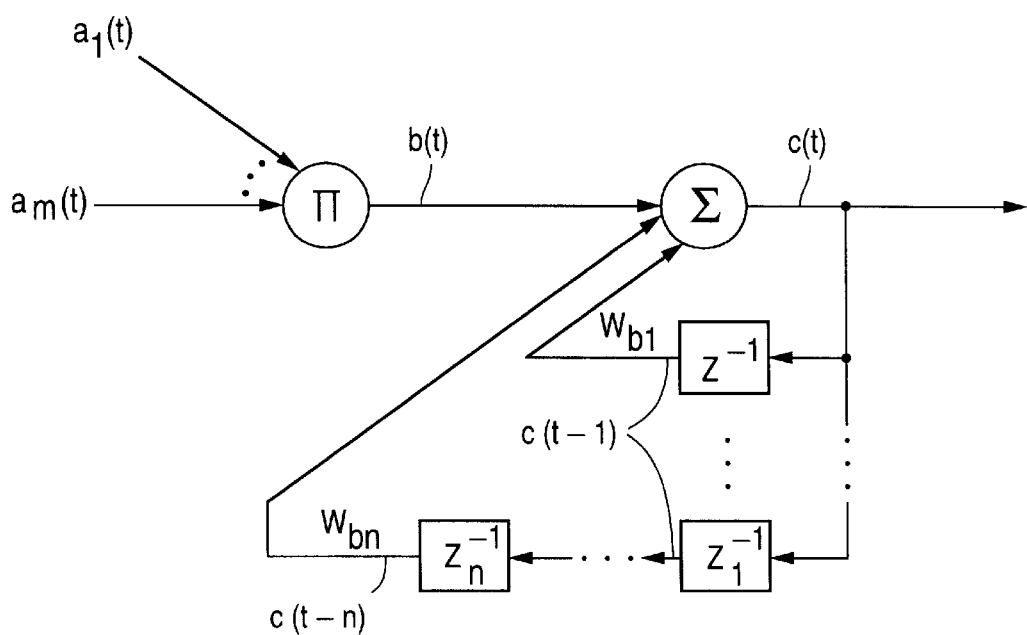
FIG. 11B illustrates the use of a sun-based neuron as a portion of the artificial neurons of FIGS. 9 and 10.

Referring to FIGS. 11A and 11B, any of the neurons for which recurrency is introduced can be either product-based in which the inputs (i.e. inter-neuron and intra-neuron) are multiplied or sum-based in which the inputs are summed or combinations of the two. For example, in FIG. 11A the neuron is product-based. Accordingly, the inputs $a_1(t), \ldots, a_m(t)$ and previous neuron outputs $b(t-1)W_{a1}, \ldots, b(t-n)W_{an}$ are multiplied to provide the present output b(t). In FIG. 11B, a combination of product-based and sum-based neurons are used. Accordingly, the inputs $a_1(t), \ldots, a_m(t)$ are multiplied and the result thereof b(t) is summed with the previous neuron outputs $c(t-1)W_{a1}, \ldots, c(t-n)W_{an}$ to provide the present output c(t). Although its learning is slower than a product-based neuron, an advantage of a sum-based neuron is that it has better tractability for convergence.

Based upon the foregoing discussion, it should be appreciated that, due to the introduction of recurrency at both the input and the output, examples of formats of the fuzzy logic rule become as follows:

For product-based neurons:

IF input X1=SH,

AND previous input $X1_1=Z1_1$,

AND . . . . ,

AND Ith previous input $X1_I=Z1_I$,

AND input X2=MH,

AND previous input $X2_1=Z2_1$,

AND . . . ,

AND Jth previous input $X2_J=Z2_J$,

AND previous output $O(t-1)=W_{R1}$,

AND . . . ,

AND Mth previous output $O(t-M)=W_{RM}$,

THEN output $O(t)=W_{fN}$.

For sum-based neurons:

IF input X1=SH,

OR previous input $X1_1=Z1_1$,

OR . . . ,

OR Ith previous input $X1_I=Z1_I$,

AND input X2=MH,

OR previous input $X2_1=Z2_1$,

OR . . . ,

OR Jth previous input $X2_J Z2_J$,

OR previous output $O(t-1)=W_{R1}$,

OR . . . ,

OR Mth previous output $O(t-M)=W_{RM}$,

THEN output $O(t)=W_{fN}$.

In accordance with the foregoing, it should be appreciated that recurrency can be introduced into a neural-fuzzy controller in the above-discussed manners, e.g. "externally" or "internally", to provide for the retention and use of context-sensitive knowledge. With external recurrency, i.e. with intra-system recurrency, a fuzzy finite state machine is created wherein knowledge of prior inputs and/or system states is used during recall operation. This allows the system to operate faster and more accurately, e.g. by classifying input patterns faster and more accurately. With internal recurrency, i.e. with intra-neuron recurrency, knowledge of prior inputs and/or system states is used during both training and recall operations, thereby providing for even more accurate system operation due to the finer, more precise system learning which takes place.

It should be understood that various alternatives to the embodiments of the present invention described herein can be employed in practicing the present invention. It is intended that the following claims define the scope of the present invention, and that structures and methods within the scope of these claims and their equivalents be covered thereby.

What is claimed is:

1. A recurrent neural network-based fuzzy logic apparatus comprising:

first neural means for receiving and processing first and second pluralities of input signals and in accordance therewith providing first and second pluralities of neural signals, wherein said first plurality of input signals originates externally to said first neural means and said first plurality of neural signals corresponds to a first plurality of fuzzy logic rule antecedents;

first time-delay means for intra-neurally receiving and time-delaying said second plurality of neural signals and in accordance therewith providing a first plurality of intra-neural recurrent signals as said second plurality of input signals;

second neural means for receiving and processing said first plurality of neural signals from said first neural means and a plurality of antecedent signals and in accordance therewith providing a plurality of consequent signals, wherein said plurality of antecedent signals corresponds to a second plurality of fuzzy logic rule antecedents and said plurality of consequent signals corresponds to a plurality of fuzzy logic rule consequents; and second time-delay means for intra-neurally receiving and time-delaying a portion of said plurality of consequent signals and in accordance therewith providing a second plurality of intra-neural recurrent signals as said plurality of antecedent signals.

2. The apparatus of claim 1, wherein said first neural means comprises a plurality of neurons for fuzzifying selected ones of said first and second pluralities of input signals and in accordance therewith providing said first plurality of neural signals.

3. The apparatus of claim 1, wherein said first neural means comprises a plurality of product-based neurons.

4. The apparatus of claim 1, wherein said first neural means comprises a plurality of sum-based neurons.

5. The apparatus of claim 1, wherein said first time-delay means comprises a plurality of time-delay elements, each for delaying by at least one unit time delay and selectively weighting a respective one of said second plurality of neural signals and in accordance therewith providing a respective one of said second plurality of input signals.

6. The apparatus of claim 1, wherein said second neural means comprises a plurality of product-based neurons.

7. The apparatus of claim 1, wherein said second neural means comprises a plurality of sum-based neurons.

8. The apparatus of claim 1, wherein said second time-delay means comprises a plurality of time-delay elements, each for delaying by at least one unit time delay and selectively weighting a respective one of said portion of said plurality of consequent signals and in accordance therewith providing a respective one of said plurality of antecedent signals.

9. A neural network apparatus for generating signals corresponding to a plurality of recurrent fuzzy logic rules, comprising:

a first plurality of neurons for receiving and selectively fuzzifying a plurality of input signals and in accordance therewith providing a plurality of fuzzified signals;

a second plurality of neurons, coupled to said first plurality of neurons, for receiving said plurality of fuzzified signals therefrom and a first plurality of intra-neural recurrent signals and in accordance therewith providing a plurality of membership signals corresponding to a plurality of fuzzy logic membership functions;

a first plurality of time-delay elements, coupled to said second plurality of neurons, for intra-neurally receiving and time-delaying a portion of said plurality of membership signals and in accordance therewith providing said first plurality of intra-neural recurrent signals; and a third plurality of neurons, coupled to said second plurality of neurons, for receiving said plurality of membership signals therefrom and a second plurality of intra-neural recurrent signals and in accordance therewith providing a plurality of rule signals corresponding to a plurality of recurrent fuzzy logic rules.

10. The apparatus of claim 9, further comprising a second plurality of time-delay elements, coupled to said third plurality of neurons, for receiving and time-delaying a portion of said plurality of rule signals and in accordance therewith providing said second plurality of recurrent signals.

11. The apparatus of claim 9, wherein said third plurality of neurons is further for providing a defuzzified output signal in accordance with said plurality of membership signals and said second plurality of recurrent signals.

12. The apparatus of claim 11, further comprising a comparator, coupled to said third plurality of neurons, for receiving and comparing a reference signal and said defuzzified output signal and in accordance therewith providing an error signal corresponding to a difference therebetween.

13. The apparatus of claim 9, further comprising an output neuron layer, coupled to said third plurality of neurons, for receiving and summing a plurality of signals therefrom and in accordance therewith providing a defuzzified output signal.

14. The apparatus of claim 13, further comprising a comparator, coupled to said output neuron layer, for receiving and comparing a reference signal and said defuzzified output signal and in accordance therewith providing an error signal corresponding to a difference therebetween.

15. A neural network apparatus for generating a plurality of recurrent fuzzy logic rules, comprising:

first neural means for receiving and selectively fuzzifying a plurality of input data and in accordance therewith providing a plurality of fuzzified data;

second neural means for receiving said plurality of fuzzified data from said first neural means and a first plurality of intra-neural recurrent data and in accordance therewith providing a plurality of membership data corresponding to a plurality of fuzzy logic membership functions;

first time-delay means for intra-neurally receiving and time-delaying a portion of said plurality of membership data and in accordance therewith providing said first plurality of intra-neural recurrent data; and third neural means for receiving said plurality of membership data from said second neural means and a second plurality of intra-neural recurrent data and in accordance therewith providing a plurality of rule data corresponding to a plurality of recurrent fuzzy logic rules.

16. The apparatus of claim 15, further comprising second time-delay means for receiving and time-delaying a portion of said plurality of rule data and in accordance therewith providing said second plurality of recurrent data.

17. The apparatus of claim 15, wherein said third neural means is further for providing defuzzified output data in accordance with said plurality of membership data and said second plurality of recurrent data.

18. The apparatus of claim 17, further comprising comparison means for receiving and comparing reference data and said defuzzified output data and in accordance therewith providing error data corresponding to a difference therebetween.

19. The apparatus of claim 15, further comprising output neural means for receiving and summing a plurality of data from said third neural means and in accordance therewith providing defuzzified output data.

20. The apparatus of claim 19, further comprising comparison means for receiving and comparing reference data and said defuzzified output data and in accordance therewith providing error data corresponding to a difference therebetween.

21. A method of signal processing in accordance with recurrent neural network-based fuzzy logic, said method comprising the steps of:

receiving and processing first and second pluralities of input signals with a first artificial neural apparatus and in accordance therewith providing first and second pluralities of neural signals, wherein said first plurality of input signals originates externally to said first artificial neural apparatus and said first plurality of neural signals corresponds to a first plurality of fuzzy logic rule antecedents;

intra-neurally time-delaying said second plurality of neural signals and in accordance therewith providing a first plurality of intra-neural recurrent signals as said second plurality of input signals;

processing said first plurality of neural signals from said first artificial neural apparatus and a plurality of antecedent signals with a second artificial neural apparatus and in accordance therewith providing a plurality of consequent signals, wherein said plurality of antecedent signals corresponds to a second plurality of fuzzy logic rule antecedents and said plurality of consequent signals corresponds to a plurality of fuzzy logic rule consequents; and intra-neurally time-delaying a portion of said plurality of consequent signals and in accordance therewith providing a second plurality of intra-neural recurrent signals as said plurality of antecedent signals.

22. The method of claim 21, wherein said step of receiving and processing first and second pluralities of input signals with a first artificial neural apparatus and in accordance therewith providing first and second pluralities of neural signals comprises fuzzifying selected ones of said first and second pluralities of input signals with a plurality of artificial neurons and in accordance therewith providing said first plurality of neural signals.

23. The method of claim 21, wherein said step of receiving and processing first and second pluralities of input signals with a first artificial neural apparatus and in accordance therewith providing first and second pluralities of neural signals comprises processing said first and second pluralities of input signals with a plurality of product-based artificial neurons.

24. The method of claim 21, wherein said step of receiving and processing first and second pluralities of input signals with a first artificial neural apparatus and in accordance therewith providing first and second pluralities of neural signals comprises processing said first and second pluralities of input signals with a plurality of sum-based artificial neurons.

25. The method of claim 21, wherein said step of time-delaying said second plurality of neural signals and in accordance therewith providing said second plurality of input signals comprises delaying by at least one unit time delay and selectively weighting individual ones of said second plurality of neural signals.

26. The method of claim 21, wherein said step of processing said first plurality of neural signals and a plurality of antecedent signals with a second artificial neural apparatus and in accordance therewith providing a plurality of output signals and a plurality of consequent signals comprises processing said first plurality of neural signals and a plurality of antecedent signals with a plurality of product-based artificial neurons.

27. The method of claim 21, wherein said step of processing said first plurality of neural signals and a plurality of antecedent signals with a second artificial neural apparatus and in accordance therewith providing a plurality of output signals and a plurality of consequent signals comprises processing said first plurality of neural signals and a plurality of antecedent signals with a plurality of sum-based artificial neurons.

28. The method of claim 21, wherein said step of time-delaying a portion of said plurality of consequent signals and in accordance therewith providing said plurality of antecedent signals comprises delaying by at least one unit time delay and selectively weighting individual ones of said plurality of consequent signals.

29. A method of generating a plurality of recurrent fuzzy logic rules, comprising:

receiving and selectively fuzzifying a plurality of input data with a first artificial neural apparatus and in accordance therewith providing a plurality of fuzzified data;

receiving said plurality of fuzzified data from said first artificial neural apparatus and a first plurality of intra-neural recurrent data with a second artificial neural apparatus and in accordance therewith providing a plurality of membership data corresponding to a plurality of fuzzy logic membership functions;

intra-neurally time-delaying a portion of said plurality of membership data and in accordance therewith providing said first plurality of intra-neural recurrent data; and receiving said plurality of membership data from said second artificial neural apparatus and a second plurality of intra-neural recurrent data with a third artificial neural apparatus and in accordance therewith providing a plurality of rule data corresponding to a plurality of recurrent fuzzy logic rules.

30. The method of claim 29, wherein said step of receiving said plurality of membership data and a second plurality of recurrent data with a third artificial neural apparatus and in accordance therewith providing a plurality of rule data corresponding to a plurality of recurrent fuzzy logic rules further comprises time-delaying a portion of said plurality of rule data and in accordance therewith providing said second plurality of recurrent data.

31. The method of claim 29, wherein said step of receiving said plurality of membership data and a second plurality of recurrent data with a third artificial neural apparatus and in accordance therewith providing a plurality of rule data corresponding to a plurality of recurrent fuzzy logic rules further comprises providing defuzzified output data in accordance with said plurality of membership data and said second plurality of recurrent data.

32. The method of claim 31, further comprising the step of receiving and comparing reference data and said defuzzified output data and in accordance therewith providing error data corresponding to a difference therebetween.

33. The method of claim 29, further comprising the step of receiving and summing a plurality of data from said third artificial neural apparatus and in accordance therewith providing defuzzified output data.

34. The method of claim 33, further comprising the step of receiving and comparing reference data and said defuzzified output data and in accordance therewith providing error data corresponding to a difference therebetween.

* * * * *